United States Patent
Fung et al.

(10) Patent No.: US 7,970,064 B2
(45) Date of Patent: Jun. 28, 2011

(54) TRANSMITTER, METHOD FOR GENERATING A PLURALITY OF LONG PREAMBLES AND COMMUNICATION DEVICE

(75) Inventors: Ho Wang Fung, Singapore (SG); Sumei Sun, Singapore (SG); Chin Keong Ho, Singapore (SG); Ying Chang Liang, Singapore (SG); Yan Wu, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 616 days.

(21) Appl. No.: 11/573,682

(22) PCT Filed: Aug. 13, 2005

(86) PCT No.: PCT/SG2005/000275
§ 371 (c)(1),
(2), (4) Date: Jul. 30, 2007

(87) PCT Pub. No.: WO2006/016858
PCT Pub. Date: Feb. 16, 2006

(65) Prior Publication Data
US 2008/0101499 A1    May 1, 2008

(51) Int. Cl.
*H04K 1/10*    (2006.01)
(52) U.S. Cl. ........ 375/260; 375/267; 375/295; 375/299; 455/101; 455/132; 455/296; 455/500; 370/203; 370/204; 370/206; 370/208; 370/210; 370/334; 370/342

(58) Field of Classification Search .................. 375/260, 375/295, 299, 267; 370/334, 342, 203, 204, 370/206, 208, 210; 455/101, 132, 296, 500
See application file for complete search history.

(56) References Cited

U.S. PATENT DOCUMENTS

| 6,473,467 | B1 | 10/2002 | Wallace et al. | |
|---|---|---|---|---|
| 2004/0151109 | A1 | 8/2004 | Batra et al. | |
| 2004/0151145 | A1 | 8/2004 | Hammerschmidt | |
| 2005/0152314 | A1* | 7/2005 | Sun et al. | 370/334 |
| 2005/0276347 | A1* | 12/2005 | Mujtaba et al. | 375/299 |

FOREIGN PATENT DOCUMENTS
GB    2411327    2/2004

OTHER PUBLICATIONS

Flarion, *OFDM for Mobile Data Communications*, Whitepaper; Mar. 2003, Flarion Technologies, Inc.

\* cited by examiner

*Primary Examiner* — Leon Flores
(74) *Attorney, Agent, or Firm* — K. David Crockett, Esq.; Niky Economy Syrengelas, Esq.; Crockett & Crockett, PC

(57) ABSTRACT

A transmitter that has a determination unit for determining a plurality of symbols (301) such that each symbol (301) has a tail component (302) and the plurality is determined in such a way that the tail components (302) are substantially equal and a tone generation unit for arranging the plurality of symbols (301) to form a plurality of long preambles (300) such that the plurality of long preambles (300) are tone-interleaved.

9 Claims, 6 Drawing Sheets

TRANSMITTER, METHOD FOR GENERATING A PLURALITY OF LONG PREAMBLES AND COMMUNICATION DEVICE

FIELD OF THE INVENTION

The invention relates to a transmitter, a method for generating a plurality of long preambles and a communication device.

BACKGROUND OF THE INVENTION

With the introduction of multiple antennas in the realization of MIMO (Multiple Input Multiple Output) systems, the transmission capacity of OFDM (orthogonal frequency division multiplexing) systems is largely expanded as the number of communication channels in space is multiplied. This benefit is derived, however, at the expense of a more complex receiver design compared with the SISO (single input single output) solution. A direct consequence of the MIMO structure that contributes to the added complexity is the need for identification of more spatial channels. More sophisticated channel estimation schemes and more pilot symbols are therefore needed.

Several challenging issues are posed when considering the design of pilots for channel estimation. The most pressing of all is associated with the provision of adequate information for identifying all channel responses between every transmit and receive antenna pair. More preambles certainly allow for more accurate channel estimation and simpler design, but are too expensive to engage due to a reduction in throughput. An excessive rise in overhead can undermine the whole idea of enhancing data throughput in MIMO transmission altogether.

Figure 1:
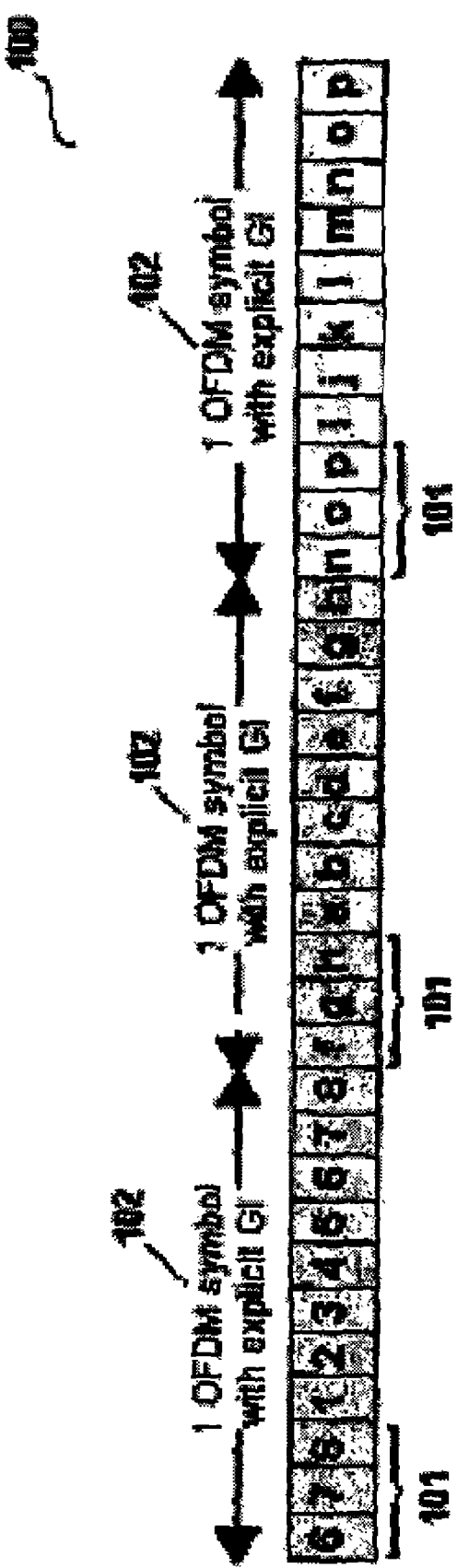

FIG. 1 shows a long preamble 100 according to prior art.

The long preamble 100 is used for the single antenna case and comprises three OFDM symbols 102 of FFT (fast Fourier transform) size $N_{FFT}=8$ and each OFDM symbol comprises a cyclic prefix (guard interval) 101 of the length $N_{CP}=3$ modulated symbols.

In this conventional design, one cyclic prefix 101 is provided for each OFDM symbol 102 in the long preamble 100 to protect it against inter-symbol interference (ISI).

An object of the invention is to provide a method for generating long preambles such that the transmission overhead necessary for long preamble transmission can be reduced compared to prior art.

The object is achieved by a transmitter, a method for generating a plurality of long preambles and a communication device with the features according to the independent claims.

SUMMARY OF THE INVENTION

A transmitter is provided comprising a determination unit for determining a plurality of symbols such that each symbol comprises a tail component and the plurality is determined in such a way that the tail components are substantially equal. The transmitter further comprises a tone generation unit for arranging the plurality of symbols to form a plurality of long preambles such that the plurality of long preambles is tone-interleaved.

Further, a method for generating a plurality of long preambles and a communication device according to the transmitter described above are provided.

SHORT DESCRIPTION OF THE FIGURES

Figure 2:
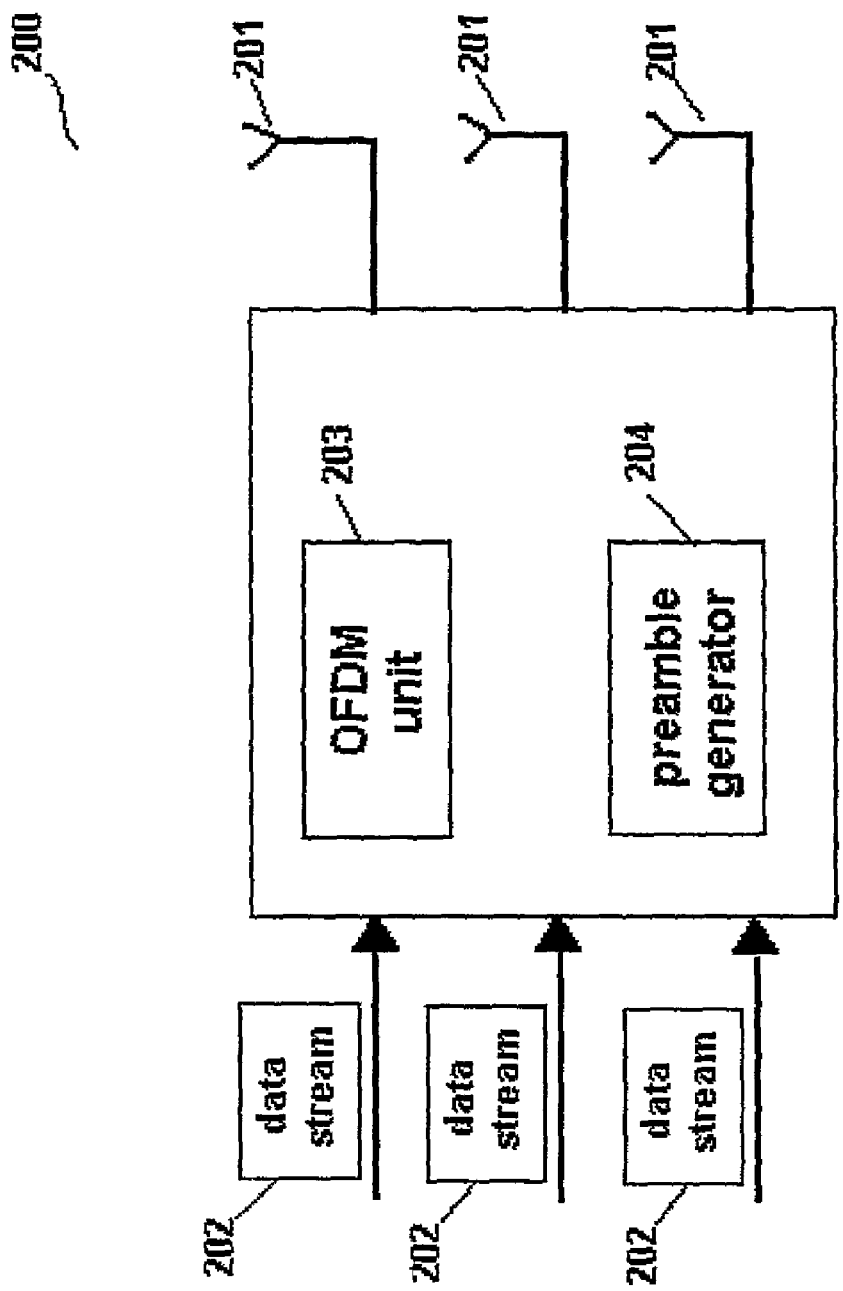
Figure 3:
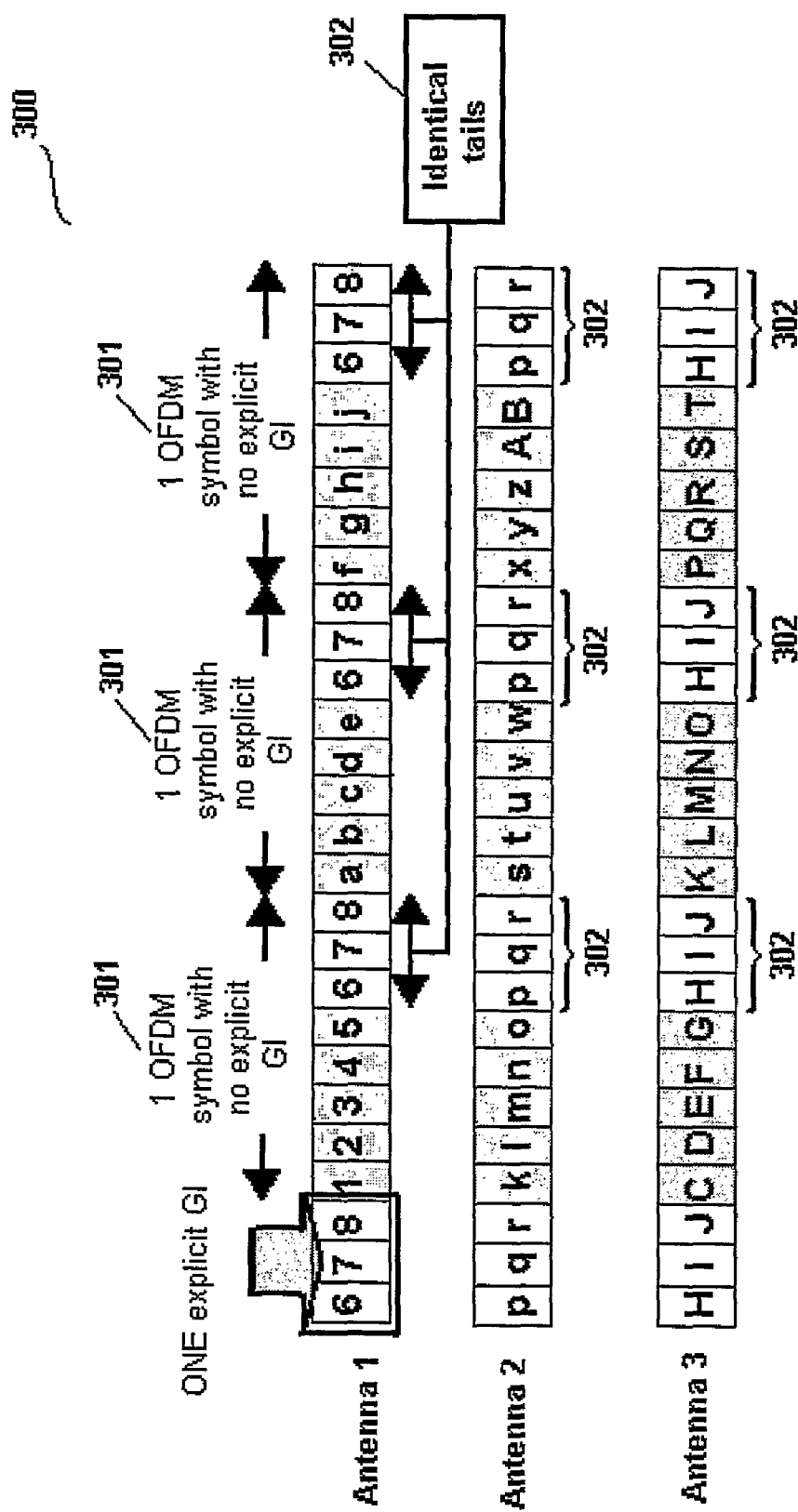
Figure 4:
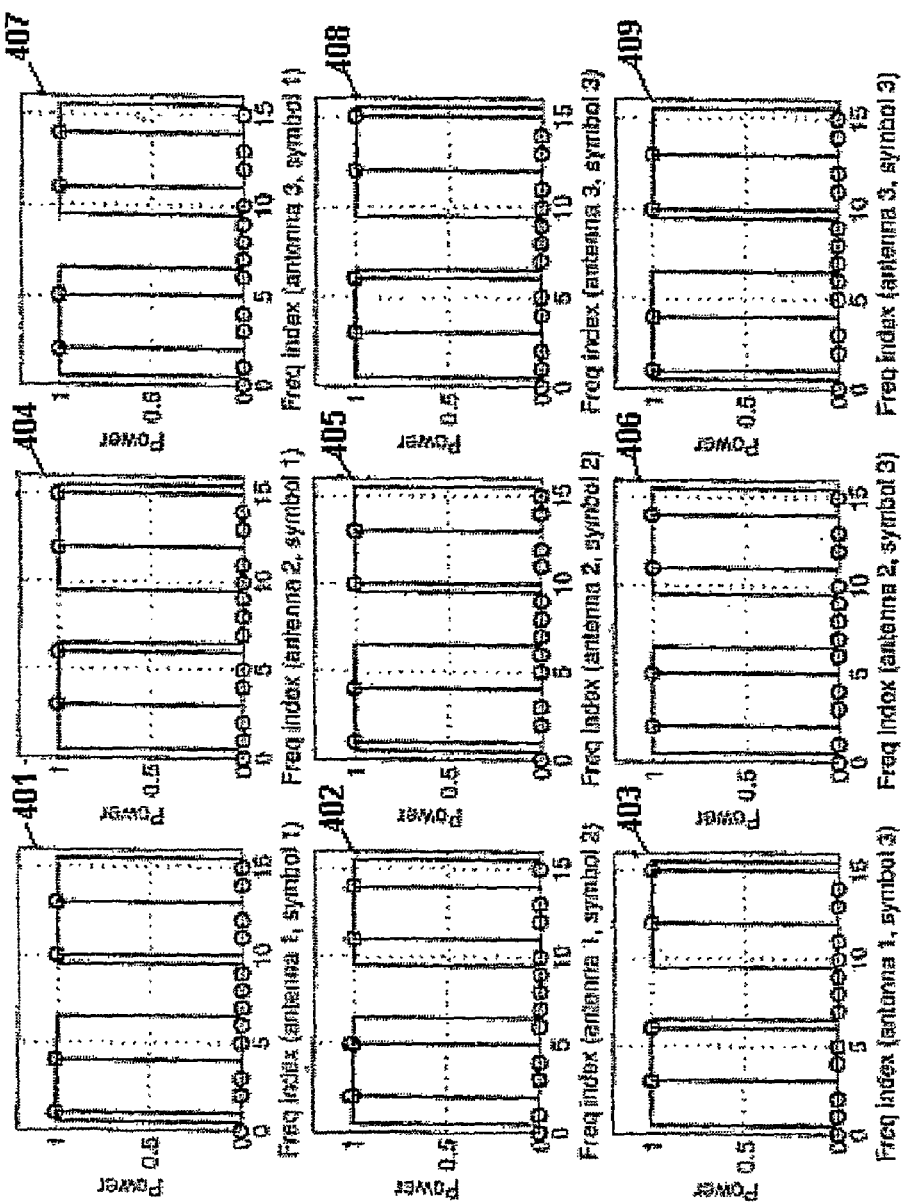
Figure 5:
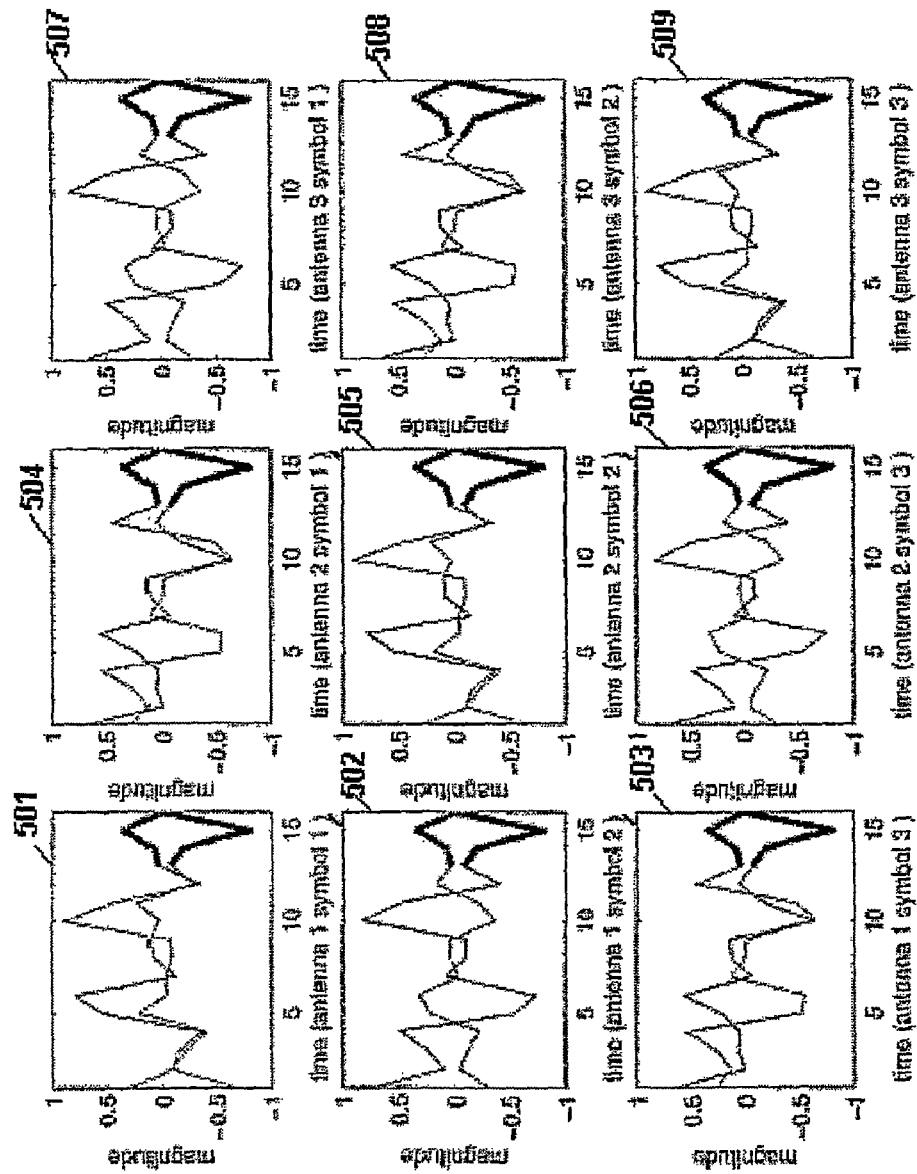
Figure 6:
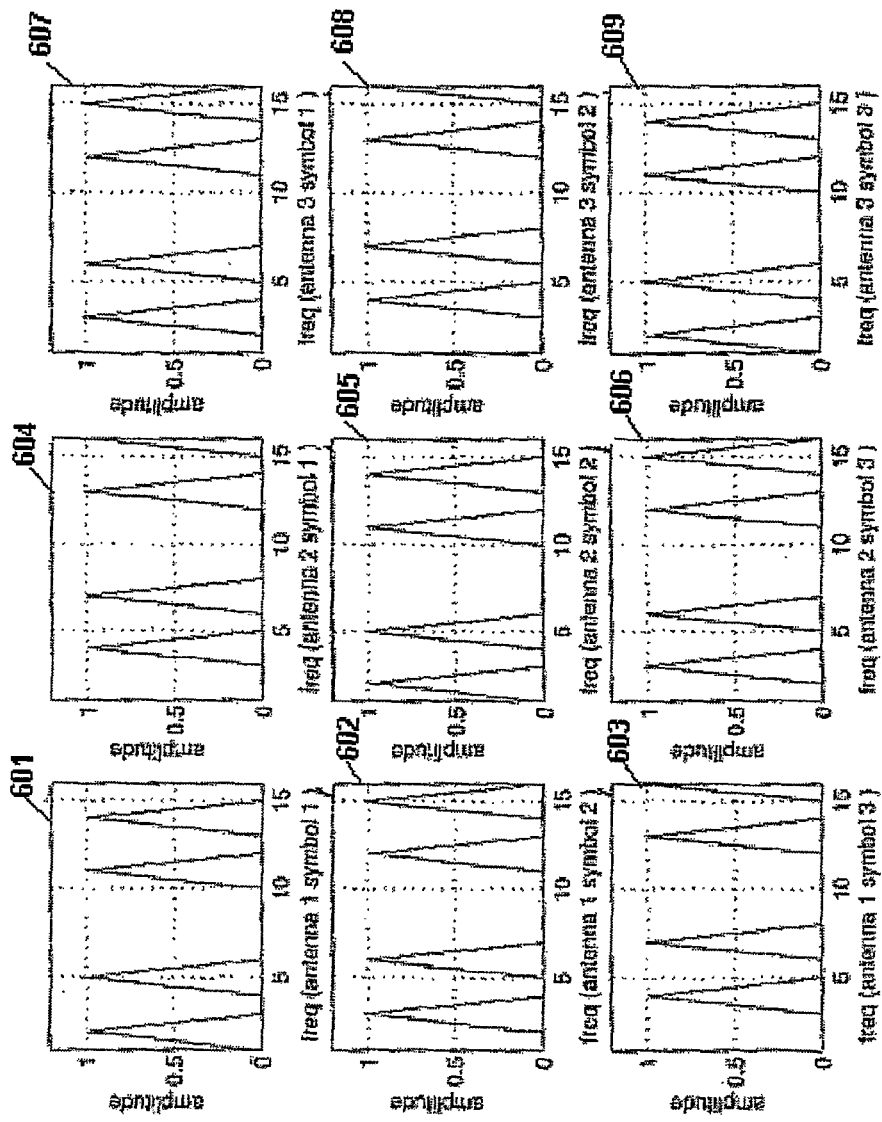

FIG. 1 shows a long preamble according to prior art.
FIG. 2 shows a transmitter according to an embodiment of the invention.
FIG. 3 shows three long preambles according to an embodiment of the invention.
FIG. 4 illustrates the frequency domain power in the transmission of long preambles according to an embodiment of the invention.
FIG. 5 illustrates the time domain values according to an embodiment of the invention.
FIG. 6 illustrates the time frequency domain values according to an embodiment of the invention.

DETAILED DESCRIPTION

Illustratively, the symbols are determined in such a way that they share a common tail and long preambles are generated such that they are tone-interleaved. Due to the common tail, no cyclic prefix of the symbols in the long preambles is necessary. Therefore, the long preambles can be significantly shortened compared to prior art. In particular, in case of a MIMO (multiple input multiple output) system, where relatively many long preamble symbols are necessary for channel estimation, a substantial reduction in transmission overhead can be achieved without compromise in performance. The common tail may be seen as an apparent cyclic prefix which is absorbed into each long preamble. The tone-interleaving property allows for simple channel estimation at the receiver.

In one embodiment, an iterative method is employed to meet the requirement of unit preamble amplitude in the frequency domain and orthogonality in space-time for optimal channel estimation performance. A template vector is constructed in one embodiment as a basis to facilitate the design of long preambles transmitted at different time and space regardless of the number of transmit and receive antennas in the corresponding communication system.

Embodiments of the invention emerge from the dependent claims. The embodiments which are described in the context of the transmitter are analogously valid for the method for generating a plurality of long preambles and the communication device.

The symbols are in one embodiment modulation symbols. For example, the symbols are OFDM symbols.

The symbols can be determined based on a decomposition of a plurality of frequencies into passband-frequencies and stopband-frequencies.

In one embodiment, the symbols are determined based on a decomposition of a Fourier transform matrix in at least two matrices according to the decomposition of the frequencies.

The symbols are for example determined based on a determination of the nullspace of one of the matrices, into which the Fourier transform matrix is decomposed.

The transmitter is for example adapted according to a MIMO system.

The communication device may be adapted as a base station. The communication device may also be adapted as a mobile communication device.

Illustrative embodiments of the invention are explained below with reference to the drawings.

FIG. 2 shows a transmitter 200 according to an embodiment of the invention.

The transmitter 200 has the structure according to a MIMO (multiple input multiple output) system. The transmitter 200 comprises three transmit antennas 201 which is each used to transmit one of a plurality of data streams 202, wherein the data streams 202 are supplied to the transmitter 200 by some data sources (not shown). Alternatively, one single data stream 202 may be supplied to the transmitter 200 which is mapped to three different data streams by the transmitter 200.

The transmitter 200 comprises an OFDM (orthogonal frequency division multiplexing) unit 203 which modulates sub-carriers sent by the transmit antennas 201 according to OFDM modulation such that the data corresponding to the data streams 202 are transmitted.

The transmitter 200 further comprises a preamble generator that is adapted to generate long preambles that are prepended to blocks of data before the blocks of data are sent.

FIG. 3 shows three long preambles 300 according to an embodiment of the invention.

Each of the long preambles 300 is sent by one transmit antenna 201 of the transmitter 200. The long preambles 300 are followed by some data to be sent (corresponding to the respective data stream 202) and there may also be sent short preambles before the long preambles 300 are sent.

As can be seen from FIG. 3, the long preambles 300 do not comprise an explicit cyclic prefix (guard interval) between the OFDM symbols 301 that are contained in the long preambles 300. The values of the OFDM symbols 301 are tuned in such a way that an identical tail 302 is shared by all OFDM symbols 301 corresponding to the same long preamble 300. The tail 302 serves the function of an official cyclic prefix.

In the long preamble 300 shown top in FIG. 3, the values {6,7,8} can be seen as both part (tail) of each OFDM 301 symbol of length 8 as well as the cyclic prefix of the following OFDM symbol 301. This idea is applied to every transmit antenna 201.

In the following, it is described how the values of the long preambles 300 are calculated.

Denoting the s-th OFDM symbol in the a-th transmit antenna in the time domain by the vector $t_{a,s}$, its frequency domain equivalent can be obtained through the Discrete Fourier Transform (DFT) matrix F by $$f_{a,s} = F t_{a,s}. \quad (1)$$

Rearranging the elements in $f_{a,s}$ into the bandpass subfrequencies denoted by $e_{n,s}$ and the bandstop sub-frequencies denoted by $O_{n,s}$, and observing that $t_{a,s}$ is composed of its head component $h_{a,s}$ and its tail component $c_a$ in the form $$t_{a,s} = \begin{bmatrix} h_{a,s} \\ c_a \end{bmatrix}, \quad (2)$$

(1) can be re-written after shuffling the rows of F as $$\begin{bmatrix} e_{a,s} \\ 0_{a,s} \end{bmatrix} = \begin{bmatrix} F_{a,s}^{[11]} & F_{a,s}^{[12]} \\ F_{a,s}^{[21]} & F_{a,s}^{[22]} \end{bmatrix} \begin{bmatrix} h_{a,s} \\ c_a \end{bmatrix} \quad (3)$$

where $F_{a,s}^{[ij]}$ comprises the corresponding components of the DFT matrix F.

Since the tail values are common to all OFDM symbols, the subscript in the tail c is free from s. For a general MIMO system with $N_{Tx}$ transmit antennas and $N_{sym}$ OFDM symbols in each long preamble, (3) can be repeatedly used to write $$\begin{bmatrix} e_{a,1} \\ e_{a,2} \\ \vdots \\ e_{a,N_{sym}} \end{bmatrix} = \begin{bmatrix} F_{a,1}^{[11]} & 0 & \cdots & 0 & F_{a,1}^{[12]} \\ 0 & F_{a,2}^{[11]} & \cdots & 0 & F_{a,2}^{[12]} \\ \vdots & \vdots & \ddots & \vdots & \vdots \\ 0 & 0 & \cdots & F_{a,N_{sym}}^{[11]} & F_{a,N_{sym}}^{[12]} \end{bmatrix} \begin{bmatrix} h_{a,1} \\ h_{a,2} \\ \vdots \\ h_{a,N_{sym}} \\ c_a \end{bmatrix} \quad (4)$$

$$\begin{bmatrix} 0 \\ 0 \\ \vdots \\ 0 \end{bmatrix} = \begin{bmatrix} F_{a,1}^{[21]} & 0 & \cdots & 0 & F_{a,1}^{[22]} \\ 0 & F_{a,2}^{[21]} & \cdots & 0 & F_{a,2}^{[22]} \\ \vdots & \vdots & \ddots & \vdots & \vdots \\ 0 & 0 & \cdots & F_{a,N_{sym}}^{[21]} & F_{a,N_{sym}}^{[22]} \end{bmatrix} \begin{bmatrix} h_{a,1} \\ h_{a,2} \\ \vdots \\ h_{a,N_{sym}} \\ c_a \end{bmatrix} \quad (5)$$

In this embodiment, the following criteria are taken into account:

C1) The long preamble power should be evenly distributed to each sub-frequency in the passband for optimal channel estimation performance (see [2]), every element in the vector $e_{n,s}$ is therefore a complex exponent.

C2) The long preambles should be tone-interleaved in the frequency domain, so different sub-frequencies at different transmit antennas in the passband are loaded at different times. For the simplest case, each sub-frequency at a particular antenna is loaded only once throughout the long preamble transmission. This implies that the combined set of loaded sub-frequencies pertaining to the vectors $e_{a,1}, e_{a,2}, \ldots, e_{a,N_{sym}}$, equals to the set of passband sub-frequencies for each antenna $a=1, 2, \ldots, N_{Tx}$ to allow all sub-channels to be estimated from the long preamble information.

For example, in a system with $N_{FFT}=16$, length of cyclic prefix $N_{CP}=4$ and $N_{Tx}=N_{sym}=3$, where the passband covers sub-frequencies {1,2,3,5,6,10,11,12,13,14,15} and the stopband {0,7,8,9}, $|f_{1,1}|=|f_{2,2}|=|f_{3,3}|=[0100100000100100]^T,$ $|f_{1,2}|=|f_{2,3}|=|f_{3,1}|=[0010010000010010]^T,$ $|f_{1,3}|=|f_{2,1}|=|f_{3,2}|=[0001001000001001]^T,$ can be chosen. This is illustrated in FIG. 4.

FIG. 4 illustrates the frequency domain power in the transmission of long preambles according to an embodiment of the invention.

The nine diagrams 401 to 409 shown in FIG. 4 illustrate the frequency domain loading at different sub-frequencies, transmit antennas and times for tone-interleaving long preambles.

It can be seen that each sub-frequency at every antenna is loaded only once in the whole period of 3 OFDM symbol duration to enable efficient channel estimation. The union of all loaded sub-frequencies at each antenna over all symbols (time) is therefore the set of passband sub-frequencies {1,2, 3,5,6,10,11,12,13,14,15}.

C3) No sub-frequency should be simultaneously loaded at two different antennas in the same OFDM symbol interval to avoid contention and interference, which causes the signals transmitted via different antennas to add up and become indistinguishable at the receiver. Referring to the example above, in transmitting the first OFDM symbol of the long preamble, antenna 1 loads sub-frequencies {1,4,10,13}, antenna 2 {2,5,11,14} and antenna 3 {3,6,12,15}, and thus, no violation of the condition.

The above can be consolidated to the requirement that if the long preamble values at each of the sub-frequencies in the passband is recorded to form a $N_{sym} \times N_{Tx}$ matrix, this time-space matrix has to be orthogonal and the amplitude of each element needs to be either unity or zero. Referring again to the same example, the time-space matrix for sub-frequencies $\{1, 4, 10, 13\}$ is $\begin{bmatrix} e^{j(*)} & 0 & 0 \\ 0 & e^{j(*)} & 0 \\ 0 & 0 & e^{j(*)} \end{bmatrix}$ $\{2, 5, 11, 14\}$ is $\begin{bmatrix} 0 & 0 & e^{j(*)} \\ e^{j(*)} & 0 & 0 \\ 0 & e^{j(*)} & 0 \end{bmatrix}$ and $\{3, 6, 12, 15\}$ is $\begin{bmatrix} 0 & e^{j(*)} & 0 \\ 0 & 0 & e^{j(*)} \\ e^{j(*)} & 0 & 0 \end{bmatrix},$ where * represents some arbitrary real values. All of these matrices are orthogonal and formed by elements with amplitudes of either 1 or 0.

The problem now is to solve for $h_{a,s}$, $e_{a,s}$ and $c_s$, for $a=1, 2, \ldots, N_{Tx}$, $s=1, 2, \ldots, N_{sym}$ subject to the orthogonality constraint.

Equations (4) and (5) can be expressed in compact form $$e_a = A_a x_a \quad (6)$$

$$0 = B_a x_a \quad (7)$$

for antenna a. If every sub-frequency in the passband is loaded only once throughout the duration of the $N_{sym}$ OFDM symbols in antenna a, the orthogonality condition is easily met by applying cyclic shift of the tone assignment in antenna a to other antennas. As such, only one antenna a needs to be considered. The solutions to the linear equation (7) are given by $$x_a = B_{a,\perp} \alpha \quad (8)$$

wherein $\alpha$ is arbitrary and $B_{a,\perp}$ is the null space of $B_a$ (i.e. the columns of $B_{a,\perp}$ form a basis of the null space of $B_a$). $B_{a,\perp}$ can be obtained by singular value decomposition (SVD) of the matrix $B_a$. Substituting (8) into (6) and defining $M = A_a B_{a,\perp}$ yields $$e_a = M_a \alpha \quad (9)$$

to which there is no closed-form solution. In fact, due to the nonlinear nature of the equation, it has possibly no solution. Therefore it is more tractable, instead, to find, given $M_a$ and that all entries in $e_a$ are complex exponents, the vector $\alpha$ that minimizes the cost function $$J_1(\underline{\alpha}) = |\underline{e} - \underline{M}\underline{\alpha}|^2 \quad (10)$$

$$= [\underline{\alpha} - (\underline{M}^H \underline{M})^{-1} \underline{M}^H \underline{e}]^H (\underline{M}^H \underline{M})$$

$$[\underline{\alpha} - (\underline{M}^H \underline{M})^{-1} \underline{M}^H \underline{e}] + \underline{e}^H \underline{e} - \underline{e}^H \underline{M}(\underline{M}^H \underline{M})^{-1} \underline{M}^H \underline{e}.$$

The subscript a has been omitted in the above for ease of notation. Clearly, the minimum value of $J_1(\alpha)$ can be found by setting $\hat{\alpha} = (M^H M)^{-1} M^H e$ and maximizing $$J_2(\underline{e}) = \underline{e}^H \underline{M}(\underline{M}^H \underline{M})^{-1} \underline{M}^H \underline{e} \quad (11)$$

$$= \underline{e}^H \underline{e} - \underline{e}^H \underline{U}_\perp \underline{U}_\perp^H \underline{e}$$

where a singular value decomposition $$\underline{M} = [\underline{U} \, \underline{U}_\perp] \begin{bmatrix} \underline{S} \\ \underline{0} \end{bmatrix} \underline{V}^H \quad (12)$$

has been carried out. Comparing (10) and (11), it is evident that to have $J_1(\alpha)=0$ implies $e^H U \perp U_\perp^H e = 0$ or $$J_3(\theta) = c^T G_r c + s^T G_r s + 2s^T G_m c = 0 \tag{13}$$

where $$c + js = \cos\theta + j\sin\theta = e \tag{14}$$

$$G_r + jG_m = U \perp U_\perp^H \tag{15}$$

and the subscript of $\theta$ in c and s has been dropped for simplicity in notation. The solution can be estimated using Newton-Raphson's iterative method upon expanding (13) into its first order Taylor series $$J_3(\theta) \approx J_3(\theta_0) + \left[\frac{dJ_3(\theta)}{d\theta}\bigg|_{\theta=\theta_0}\right]^T \Delta\theta \tag{16}$$

to yield the minimum norm solution of $$\theta_{n+1} = \theta_n - \frac{J_3(\theta_n)}{\left|\frac{dJ_3(\theta)}{d\theta}\bigg|_{\theta=\theta_n}\right|^2}, \tag{17}$$

where $$\frac{dJ_3(\theta)}{d\theta} = 2(\underline{CG_r s} - \underline{SG_r c} + \underline{SG_m s} + \underline{CG_m c}) \tag{18}$$

and C and S are diagonal matrices with their main diagonals being c and s respectively, and subscripts of $\theta$ again omitted.

The simple example introduced above is now used to illustrate the procedures involved in attaining the proposed tone-interleaving long preambles. Accordingly, it is assumed that $N_{FFT}=16$, $N_{CP}=4$, $N_{Tx}=N_{sym}=3$ with the passband over the sub-frequencies $\{1,2,3,5,6,10,11,12,13,14,15\}$ and the stop-band $\{0,7,8,9\}$. The following steps are carried out:

S1) For a tone-interleaving design, $$F_{a,1}^{[11]} = F\{1, 4, 10, 13\}, \{0, 1, \ldots, 11\}$$

$$F_{a,2}^{[11]} = F\{2, 5, 11, 14\}, \{0, 1, \ldots, 11\}$$

$$F_{a,3}^{[11]} = F\{3, 6, 12, 15\}, \{0, 1, \ldots, 11\}$$

$$F_{a,1}^{[21]} = F\{0, 2, 3, 5, 6, 7, 8, 9, 11, 12, 14, 15\}, \{0, 1, \ldots, 11\}$$

$$F_{a,2}^{[21]} = F\{0, 1, 3, 4, 6, 7, 8, 9, 10, 12, 13, 15\}, \{0, 1, \ldots, 11\}$$

$$F_{a,3}^{[21]} = F\{0, 1, 2, 4, 5, 7, 8, 9, 10, 11, 13, 14\}, \{0, 1, \ldots, 11\}$$

$$F_{a,1}^{[12]} = F\{1, 4, 10, 13\}, \{12, 13, \ldots, 15\}$$

$$F_{a,2}^{[12]} = F\{1, 4, 10, 13\}, \{12, 13, \ldots, 15\}$$

$$F_{a,3}^{[12]} = F\{1, 4, 10, 13\}, \{12, 13, \ldots, 15\}$$

$$F_{a,1}^{[22]} = F\{0, 2, 3, 5, 6, 7, 8, 9, 11, 12, 14, 15\}, \{12, 13, \ldots, 15\}$$

$$F_{a,2}^{[22]} = F\{0, 1, 3, 4, 6, 7, 8, 9, 10, 12, 13, 15\}, \{12, 13, \ldots, 15\}$$

$$F_{a,3}^{[22]} = F\{0, 1, 2, 4, 5, 7, 8, 9, 10, 11, 13, 14\}, \{12, 13, \ldots, 15\}$$

is set where $F_{rows}$, columns (on the right hand side of the above equations) denotes the sub-matrix generated by the set of rows and columns (as specified by the subscripts) of the DFT matrix F.

S2) The matrices $A_a \in \square^{12 \times 40}$ and $B_a \in \square^{36 \times 40}$ in (6) and (7) are then formed according to (4) and (5).

S3) A singular value decomposition of $B_a$, which is of rank 36, is then performed. The null space matrix $B_{a,\perp} \in \square^{40 \times 4}$ can be easily derived by extracting the 4 columns in the right singular matrix of $B_a$ that correspond to the 4 zero singular values.

S4) The matrix $M = A_a B_{a,\perp} \in \square^{12 \times 4}$ is then computed to be $$M = \begin{bmatrix} 0.1314 - 0.0656j & 0.0498 + 0.0640j & -0.0820 + 0.2557j & 0.4933 + 0.2236 \\ 0.2629 - 0.2779j & 0.1534 - 0.3681j & -0.3530 - 0.2282j & 0.1734 - 0.0768j \\ -0.3232 - 0.1455j & 0.2639 - 0.0042j & -0.1283 - 0.0616j & 0.0598 + 0.0469j \\ 0.0101 + 0.1900j & -0.0842 + 0.3566j & -0.4363 - 0.1382j & 0.1316 + 0.2945j \\ -0.362 - 0.0994j & -0.2704 + 0.1212j & -0.2168 + 0.1434j & 0.0571 + 0.4973j \\ 0.2859 - 0.0424j & 0.2388 + 0.0233j & -0.0252 - 0.3567j & 0.1752 + 0.2056j \\ -0.0840 - 0.4155j & 0.2432 + 0.2530j & 0.0386 + 0.0040j & -0.1925 + 0.0210j \\ -0.3013 - 0.0169j & -0.2694 + 0.2126j & -0.0367 - 0.4315j & -0.1925 + 0.0210j \\ 0.1290 - 0.2757j & -0.3740 - 0.2405j & -0.2904 - 0.0006j & 0.0848 - 0.1165j \\ 0.2518 + 0.0465j & -0.0582 + 0.1704j & 0.1981 - 0.1552j & -0.2905 - 0.1578j \\ 0.3446 - 0.2602j & 0.0283 + 0.4322j & -0.0882 + 0.1392j & -0.1142 + 0.2943j \\ -0.0759 - 0.3421j & -0.2172 + 0.0169j & 0.3478 - 0.1786j & 0.0531 - 0.2601j \end{bmatrix}$$

The null space $U_\perp \in \Box^{12\times 8}$ of M is similarly obtained from the 8 columns of the right singular matrix of M associated with the 8 zero singular values.

S5) $G_r \in \Box^{12\times 12}$ and $G_m \in \Box^{12\times 12}$ are calculated in accordance with (15). A random vector $\theta_0 \in \Box^{12\times 1}$ is fit into (13), (17) and (18) to produce $\theta_n$ after n iterations.

S6) The vector $\theta$ is then created using (14). With reference to (4) and (6), the time domain preamble can be obtained from $\hat{x}_a = (A_a)^+ e_a$ where the superscript+denotes pseudo-inversion, and therefore $$t_{a,1} = \begin{bmatrix} [\hat{x}_a]_{1,2,\ldots,12} \\ [\hat{x}_a]_{37,38,39,40} \end{bmatrix}$$

$$t_{a,2} = \begin{bmatrix} [\hat{x}_a]_{13,14,\ldots,24} \\ [\hat{x}_a]_{37,38,39,40} \end{bmatrix}$$

$$t_{a,3} = \begin{bmatrix} [\hat{x}_a]_{25,26,\ldots,36} \\ [\hat{x}_a]_{37,38,39,40} \end{bmatrix}.$$

(19)

The resulting time domain preamble values are $$t_{a,1} = \begin{bmatrix} 0.2763 - 0.6893j \\ -0.0888 - 0.0868j \\ -0.1507 - 0.2166j \\ -0.3636 - 0.4049j \\ 0.5349 + 0.1983j \\ 0.7882 - 0.0394j \\ -0.1296 - 0.0342j \\ 0.0847 - 0.0864j \\ 0.1093 - 0.0820j \\ 0.0330 + 0.8921j \\ 0.2270 + 0.4489j \\ -0.2883 - 0.3459j \\ -0.0723 + 0.0313j \\ -0.1907 + 0.0824j \\ -0.7950 + 0.3435j \\ 0.0256 - 0.0111j \end{bmatrix}, t_{a,2} = \begin{bmatrix} 0.6947 - 0.3002j \\ 0.1021 - 0.0441j \\ 0.2404 - 0.1039j \\ 0.4874 - 0.1039j \\ -0.5328 + 0.2302j \\ -0.7391 + 0.3194j \\ 0.0852 - 0.0368j \\ -0.0996 + 0.0431j \\ -0.0896 + 0.0387j \\ 0.8277 - 0.3577j \\ 0.4694 - 0.2029j \\ -0.4134 + 0.1786j \\ -0.0723 + 0.0313j \\ -0.1907 + 0.0824j \\ -0.7950 + 0.3435j \\ 0.0256 - 0.0111j \end{bmatrix},$$

$$t_{a,3} = \begin{bmatrix} 0.6914 + 0.2712j \\ 0.0024 + 0.1242j \\ 0.0545 + 0.2581j \\ 0.0457 + 0.5423j \\ 0.2222 - 0.5255j \\ 0.5689 - 0.5470j \\ -0.0639 + 0.1177j \\ 0.1209 - 0.0025j \\ 0.1346 - 0.0233j \\ -0.6270 - 0.6354j \\ -0.1713 - 0.4730j \\ 0.0542 + 0.4470j \\ -0.0723 + 0.0313j \\ -0.1907 + 0.0824j \\ -0.7950 + 0.3435j \\ 0.0256 - 0.0111j \end{bmatrix}$$

Tone interleaving is accomplished by setting $$t_{1,1} = t_{2,2} = t_{3,3} = t_{a,1},$$

$$t_{1,2} = t_{2,3} = t_{3,1} = t_{a,2},$$

$$t_{1,3} = t_{2,1} = t_{3,2} = t_{a,3}$$

(20)

which are mapped to their frequency domain values via the DFT matrix F as described in (1).

FIG. 5 illustrates the time domain values according to an embodiment of the invention.

The time domain values are shown in the diagrams 501 to 509 for all antennas according to the example above. The tails (shown bold in FIG. 3) formed by the last four samples are identical for each antenna.

FIG. 6 illustrates the time frequency domain values according to an embodiment of the invention.

The frequency domain values are shown in the diagrams 601 to 609 for all antennas according to the example above.

There are situations where the procedure described above is inadequate for satisfactory tone-interleaving designs. This occurs when the number of transmit antennas is too large to allow sufficient degrees of freedom in (9) to solve (13). As a result, the long preamble tones will fail to acquire unit amplitudes in the frequency domain. In such cases, orthogonality in space-time for every sub-frequency can be achieved by introducing special orthogonal matrices as an alternative to the tone-interleaving strategy. The idea is to produce common tail long preambles from a small set of tone-interleaving sequences by linear combination using orthogonal matrices.

To illustrate the concept, the design example above is considered. Careful observations shows that the interleaving tones have amplitudes deviating slightly from unity, by a maximum of about 1,6%. Instead of designing $N_{Tx}=3$ sets of interleaving tones, $n_{Tx}=2<N_{Tx}$ sets can be designed by the same procedure to arrive at $$t_{a,1} = \begin{bmatrix} 0.6187 + 0.2740j \\ 0.4016 - 0.2019j \\ 0.1971 + 0.2353j \\ 0.3187 + 1.2004j \\ 0.1768 + 0.2978j \\ 0.0916 - 0.7011j \\ 0.2225 - 0.0926j \\ -0.1547 + 0.0382j \\ -0.6187 - 0.2740j \\ -0.4016 + 0.2019j \\ -0.1971 - 0.2353j \\ 0.3187 - 1.2004j \\ -0.1768 - 0.2978j \\ 0.0916 + 0.7011j \\ -0.2225 + 0.0926j \\ 0.1547 - 0.0382j \end{bmatrix}, t_{a,2} = \begin{bmatrix} 0.4234 - 0.6445j \\ 0.1488 - 0.9199j \\ -0.0241 + 0.8497j \\ -0.2119 + 0.2570j \\ -0.1768 - 0.2978j \\ -0.0916 + 0.7011j \\ -0.2225 + 0.0926j \\ 0.1547 - 0.0382j \\ 0.4234 - 0.6445j \\ 0.1488 - 0.9199j \\ -0.0241 + 0.8497j \\ -0.2119 + 0.2570j \\ -0.1768 - 0.2978j \\ -0.0916 + 0.7011j \\ -0.2225 + 0.0926j \\ 0.1547 - 0.0382j \end{bmatrix}$$

Since the $n_{Tx}=2$ sets have a common tail (the last 4 samples) in the time domain, if they are linearly combined by any arbitrary ratio $k_1$ and $k_2$, the resulting signal will always end up with a fixed tail so long as $k_1+k_2$ is fixed. For instance, if the first set is multiplied by 1 and the second set is multiplied by $e^{j2\pi/3}$ or the first set by $e^{j2\pi/3}$ and the second by 1, $k_1+k_2=1+e^{j2\pi/3}$ in either case and the resulting time domain waveforms share a common tail.

Both waveforms do now occupy all the passband sub-frequencies instead of being tone-interleaving. This can be understood when the portions of the two tone-interleaving sets are mixed in according to the linear combination. Since the linear combining ratios 1 and $e^{j2\pi/3}$ are both of magnitude 1, multiplying the 2 sets by these factors does not change their amplitude in frequency. As the 2 sets are still interleaved in frequency after scaling, adding them together will result in a waveform loaded at all passband frequencies.

Following this principle, sets of long preamble sequences can be easily created that meet the common time domain tail and frequency domain mask requirements by linearly combining a small tone-interleaving set in complex exponent ratios for each antenna at different times. If it is ensured that the sequences chosen by different antennas are orthogonal in space-time for channel estimation, then the design is complete. Suppose there are $n_{Tx}$ tone-interleaving sets, and set i is multiplied with the linear combining coefficient $e_i^{\theta_{a,s}}$ for antenna a (space) and at long preamble symbol (time) s, then it is sufficient for the orthogonality condition to hold by having $$\sum_{i=1}^{n_{Tx}} E_i = \underline{1}c^H, \quad (21)$$

$$\underline{E}_i^H \underline{E}_i = \underline{I}, \forall i = 1, 2, \ldots, n_{Tx}$$

where $[E_i]_{a,s} = e_i^{\theta_{a,s}}$, $a=1, 2, \ldots, n_{Tx}$, $s=1, 2, \ldots, N_{sym}$, $\underline{1}$ is a column vector of ones and $c \in \square^{N_{Tx} \times 1}$ is an arbitrary complex vector. The first equation guarantees that the linear combination ratios add to a constant over all symbols to realize a common tail for each antenna in the time domain. The second equation ensures orthogonality across space-time.

Referring to the example, if $$E_1 = \frac{1}{\sqrt{3}} \begin{bmatrix} e^{j2\pi/3} & 1 & 1 \\ 1 & e^{j2\pi/3} & 1 \\ 1 & 1 & e^{j2\pi/3} \end{bmatrix}$$

$$E_2 = \frac{1}{\sqrt{3}} \begin{bmatrix} 1 & e^{j2\pi/3} & e^{j2\pi/3} \\ e^{j2\pi/3} & 1 & e^{j2\pi/3} \\ e^{j2\pi/3} & e^{j2\pi/3} & 1 \end{bmatrix}$$

is set, the conditions in (21) are satisfied with $$E_1 + E_2 = \frac{3+\sqrt{3}}{6} \underline{1}\underline{1}^H.$$

The complete long preamble sequence at the 3 antennas are obtained as $E_1 \otimes t_{a,1} + E_2 \otimes t_{a,2}$ where $\otimes$ represents the Kronecker product. The common tails are shared at different times (symbols). Space time orthogonality at each sub-frequency can be easily verified from the frequency domain values $$\underline{f}_{1,1} = \underline{f}_{2,2} = \underline{f}_{3,3} = \begin{bmatrix} 0.0000 + 0.0000j \\ -0.3047 + 0.4904j \\ 0.2451 - 0.5227j \\ 0.4849 + 0.3134j \\ 0.0161 - 0.5771j \\ -0.5554 - 0.1579j \\ -0.4398 + 0.3741j \\ -0.0000 - 0.0000j \\ -0.0000 + 0.0000j \\ -0.0000 + 0.0000j \\ 0.5386 + 0.2080j \\ -0.5730 - 0.0711j \\ 0.2687 - 0.5110j \\ 0.2337 + 0.5279j \\ 0.3492 - 0.4597j \\ -0.5480 - 0.1817j \end{bmatrix}$$

$$\underline{f}_{p,q|p,q=1,2,3;p \neq q} = \begin{bmatrix} 0.0000 + 0.0000j \\ 0.5770 + 0.0187j \\ 0.3302 + 0.4736j \\ 0.0290 - 0.5766j \\ 0.4918 + 0.3025j \\ 0.1410 + 0.5599j \\ -0.1041 - 0.5679j \\ 0.0000 - 0.0000j \\ 0.0000 - 0.0000j \\ 0.0000 + 0.0000j \\ -0.4495 + 0.3624j \\ 0.2249 + 0.5318j \\ 0.3082 + 0.4882j \\ 0.3403 - 0.4664j \\ 0.2235 + 0.5323j \\ 0.1167 + 0.5654j \end{bmatrix}$$

For instance, sub-frequency with index 1 is loaded in space-time with the values $$\begin{bmatrix} -0.3047 + 0.4904j & 0.5770 + 0.0187j & 0.5770 + 0.0187j \\ 0.5770 + 0.0187j & -0.3047 + 0.4904j & 0.5770 + 0.0187j \\ 0.5770 + 0.0187j & 0.5770 + 0.0187j & -0.3047 + 0.4904j \end{bmatrix} =$$

$$(-0.3047 + 0.4904j) \begin{bmatrix} 1 & e^{j2\pi/3} & e^{j2\pi/3} \\ e^{j2\pi/3} & 1 & e^{j2\pi/3} \\ e^{j2\pi/3} & e^{j2\pi/3} & 1 \end{bmatrix}$$

which is an orthogonal matrix as expected.

The procedure is summarized below:
1. Given a number of antennas $N_{Tx}$, design tone-interleaving sets for $n_{Tx}$ antennas, where $n_{Tx} < N_{Tx}$.
2. Design mixing matrices $E_i \in \square^{N_{Tx} \times N_{Tx}}$, $i=1, 2, \ldots, n_{Tx}$ that satisfy (21) and (22) wherein every element in $E_i$ is a complex exponent.

In the extreme case when the degrees of freedom are still inadequate to solve (13), extra freedom can be released by lifting the constraint in (21) through zero tail adoption. This works by assigning any arbitrary orthogonal matrix $E_1$ and $E_2=-E_1$ to two tone-interleaving sets such that c=0 in (21).

Since the two mixing matrices work to subtract the common tails of the tone-interleaving sets in the time domain, the resulting tail is always zero. The advantage of this design is that the tone-interleaving sets can be readily re-used when the number of transmit antennas in the system configuration changes by simply employing another orthogonal matrix $E_1$.

Illustrating again with the same example, by applying FFT as the mixing matrix $$E_1 = -E_2 = \frac{1}{\sqrt{3}}\begin{bmatrix} 1 & 1 & 1 \\ 1 & e^{j2\pi/3} & e^{j4\pi/3} \\ 1 & e^{j4\pi/3} & e^{j2\pi/3} \end{bmatrix}$$

a zero tail non-tone-interleaving long preamble sequence can be generated. If the system is reduced to $N_{Tx}=2$, a simple change to a size 2 FFT matrix to $$E_1 = -E_2 = \frac{1}{\sqrt{2}}\begin{bmatrix} 1 & 1 \\ 1 & -1 \end{bmatrix}$$

leads to a zero-tail preamble design with $N_{FFT}=16$, $N_{Tx}=N_{sym}=2$.

In the following, an alternative for solving equation (9) is given.

Assuming that $e_a$ is known, the minimum squared error solution to (9) can be written as $$\hat{\alpha} = M_a^\dagger e_a \quad (22)$$

Substituting $\hat{\alpha}$ for $\alpha$ in (9) results in the iterative equation $$e_{a[n+1]} = M_a M_a^\dagger e_{a[n]}.$$

However, since the operation on the right hand side does not warrant an exponential vector required on the left, the iteration has to be modified as $$x_{a[n+1]} = M_a M_a^\dagger e_{a[n]}$$
$$[e_{a[n+1]}]_i = \frac{[x_{a[n+1]}]_i}{|[x_{a[n+1]}]_i|}$$

where $[\bullet]_i$ denotes the i-th element of the vector in the argument.

The invention claimed is:

1. A transmitter comprising:
   a determination unit for determining a plurality of different long preamble symbols such that each symbol comprises a tail component and the plurality is determined in such a way that the tail components are substantially equal in content, wherein the symbols are determined based on a decomposition of a Fourier transform matrix in at least two matrices according to a decomposition of a plurality of frequencies into passband-frequencies and stopband frequencies; and
   a tone generation unit for arranging the plurality of symbols to form a plurality of long preambles such that the plurality of long preambles is tone-interleaved and such that the plurality of long preambles forms a sequence of long preambles in which the long preambles are connected without explicit guard intervals in between the long preambles.

2. A transmitter according to claim 1, wherein the symbols are modulation symbols.

3. A transmitter according to claim 2, wherein the symbols are OFDM symbols.

4. A transmitter according to claim 1, wherein the symbols are determined based on a determination of the nullspace of one of the matrices, into which the Fourier transform matrix is decomposed.

5. A transmitter according to claim 1 which is adapted according to a MIMO system.

6. A method for preamble transmission carried out by a transmitter, the method comprising:
   the transmitter determining a plurality of different long preamble symbols such that each symbol comprises a tail component and the plurality is determined in such a way that the tail components are substantially equal in content, wherein the symbols are determined based on a decomposition of a Fourier transform matrix in at least two matrices according to a decomposition of a plurality of frequencies into passband-frequencies and stopband-frequencies;
   the transmitter arranging the plurality of symbols to form the plurality of long preambles such that the plurality of long preambles is tone-interleaved and such that the plurality of long preambles forms a sequence of long preambles in which the long preambles are connected without explicit guard intervals in between the long preambles;
   the transmitter transmitting the plurality of long preambles.

7. A communication device comprising a transmitter, the transmitter comprising:
   a determination unit for determining a plurality of different long preamble symbols such that each symbol comprises a tail component and the plurality is determined in such a way that the tail components are substantially equal in content, wherein the symbols are determined based on a decomposition of a Fourier transform matrix in at least two matrices according to a decomposition of a plurality of frequencies into passband-frequencies and stopband-frequencies;
   a tone generation unit for arranging the plurality of symbols to form a plurality of long preambles such that the plurality of long preambles is tone-interleaved and such that the plurality of long preambles forms a sequence of long preambles in which the long preambles are connected without explicit guard intervals in between the long preambles.

8. A communication device according to claim 7, which is adapted as a base station.

9. A communication device according to claim 7, which is adapted as a mobile communication device.

* * * * *